US010388294B1

(12) United States Patent
Shah (10) Patent No.: US 10,388,294 B1
(45) Date of Patent: Aug. 20, 2019

(54) SPEECH-BASED AND GROUP-BASED CONTENT SYNCHRONIZATION (75) Inventor: Mehal H. Shah, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 806 days.

(21) Appl. No.: 13/527,894

(22) Filed: Jun. 20, 2012

(51) Int. Cl.
G10L 15/26 (2006.01)
G10L 19/035 (2013.01)
G10L 19/02 (2013.01)

(52) U.S. Cl.
CPC ........ *G10L 19/035* (2013.01); *G10L 19/0204* (2013.01)

(58) Field of Classification Search
USPC ........................................ 704/235
See application file for complete search history.

(56) References Cited

U.S. PATENT DOCUMENTS

| 6,470,306 | B1* | 10/2002 | Pringle | G06F 17/241 704/3 |
| 7,066,737 | B1* | 6/2006 | Mistry | G09B 17/02 434/178 |
| 7,844,254 | B2* | 11/2010 | Arnold | G06Q 20/40 455/411 |
| 7,996,776 | B2* | 8/2011 | Parker | G06F 3/0481 715/201 |
| 8,434,001 | B2* | 4/2013 | Kandekar | G06F 17/30719 707/602 |
| 8,566,708 | B1* | 10/2013 | Pereira | G06F 17/24 715/256 |
| 8,700,384 | B1* | 4/2014 | Lattyak | G06F 9/454 704/8 |
| 8,799,765 | B1* | 8/2014 | MacInnis | G06F 17/241 715/230 |
| 8,966,062 | B1* | 2/2015 | Giese | G06F 17/30026 709/224 |
| 9,002,703 | B1* | 4/2015 | Crosley | G06Q 10/101 704/206 |
| 9,116,654 | B1* | 8/2015 | Shah | G06F 3/14 |
| 2002/0072906 | A1* | 6/2002 | Koh | G10L 13/00 704/260 |
| 2003/0152894 | A1* | 8/2003 | Townshend | G09B 7/04 434/178 |
| 2004/0252654 | A1* | 12/2004 | Arnold | G06Q 20/40 370/310 |
| 2005/0034063 | A1* | 2/2005 | Baker | G06F 17/2247 715/241 |

(Continued)

*Primary Examiner* — Daniel C Washburn
*Assistant Examiner* — Timothy Nguyen
(74) *Attorney, Agent, or Firm* — Lee & Hayes, P.C.

(57) ABSTRACT

Techniques for enhancing synchronization capabilities of electronic devices based on audio and on group activities are described herein. The electronic device may be configured to receive an audio signal that represents speech. The electronic device may determine whether the audio signal is associated with a location in a content item or whether the audio signal corresponds to a phrase. The electronic device may update a location setting based on the determined location, may update a location setting based on the phrase, or may provide an option to create a phrase. The electronic device may be further configured to determine a location setting for a content item based on a location setting for that content item received from another device, that device and the electronic device belonging to a group.

22 Claims, 4 Drawing Sheets

(56) References Cited

U.S. PATENT DOCUMENTS

| | | | |
|---|---|---|---|
| 2005/0141680 A1* | 6/2005 | Tucker | H04M 1/6505 379/88.18 |
| 2007/0100626 A1* | 5/2007 | Miller | G09B 21/009 704/258 |
| 2007/0118794 A1* | 5/2007 | Hollander | G06F 17/241 715/205 |
| 2007/0204047 A1* | 8/2007 | Parker | G06F 3/0481 709/227 |
| 2008/0140412 A1* | 6/2008 | Millman | G09B 7/02 704/270 |
| 2009/0319265 A1* | 12/2009 | Wittenstein | G10L 21/04 704/234 |
| 2010/0177877 A1* | 7/2010 | Hamaker | H04M 3/53358 379/88.14 |
| 2011/0261030 A1* | 10/2011 | Bullock | G06F 15/0283 345/204 |
| 2011/0288861 A1* | 11/2011 | Kurzweil | G09B 5/06 704/235 |
| 2012/0041765 A1* | 2/2012 | Chien | G10L 13/08 704/260 |
| 2012/0151351 A1* | 6/2012 | Kilroy | G06Q 30/02 715/733 |
| 2012/0240036 A1* | 9/2012 | Howard | G06F 17/217 715/251 |
| 2012/0272159 A1* | 10/2012 | Seth | G06Q 10/10 715/751 |
| 2013/0283145 A1* | 10/2013 | Argent | G06F 17/241 715/231 |
| 2014/0006914 A1* | 1/2014 | Visconsi | G06F 17/211 715/202 |

\* cited by examiner

SPEECH-BASED AND GROUP-BASED CONTENT SYNCHRONIZATION

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for enhancing synchronization capabilities of electronic devices based on audio and on group activities. These synchronization capabilities may be implemented on electronic devices, on a remote content service, or partly on electronic devices and partly on a remote content service. While existing synchronization capabilities provide for the synchronization between multiple copies of a content item stored on multiple devices of a user, these capabilities do not allow for updating location settings of these content items based on other types of input. As used herein, the term "content items" includes electronic versions of books, newspapers, magazines, and other printed media.

To expand synchronization capabilities for a user, an electronic device may be configured to receive an audio signal that represents speech. Upon receipt of the audio signal, either the electronic device or a content service may perform speech-to-text conversion using the audio signal to obtain a textual representation of the speech represented by the audio signal. The electronic device or the content service may then determine whether the textual representation is associated with any phrase belonging to a group of phrases associated with a content item.

In response to determining that the textual representation is associated with a phrase, the electronic device or the content service determines a location in the content item that is associated with the phrase and updates a location setting of the content item for the electronic device based at least in part on the determined location.

In response to determining that the textual representation is not associated with a phrase, the electronic device or the content service provides an option for a user of the electronic device to create a phrase to associate with the speech. Upon creation of the phrase, the phrase may be provided to the content service and may be shared with other users. The electronic device may also include a feedback mechanism to enable the user to downvote or remove phrases created by users.

In various embodiments, the electronic device may further be configured to receive an audio signal that represents speech in response to actuation of a control of the electronic device. Upon receipt of the audio signal, the electronic device or a content service may perform speech-to-text conversion using the audio signal to obtain a textual representation of the speech represented by the audio signal. The electronic device or the content service may then determine one or more locations in a content item that are associated with the textual representation. To determine the locations, the electronic device or the content service may utilize the textual representation as a search string, attempt to find matching content in the content item, and return locations(s) associated with matching content. In other embodiments, the electronic device may simply provide the textual representation to the content service and receive, in return, one or more locations associated with the textual representation. If multiple locations are returned, the electronic device or the content service may enable a user to select one of the locations. In other embodiments, the receiving of audio signals and determining of locations may be performed until a single location is returned. The electronic device or the content service may then update a location setting for the content item for the electronic device based at least in part on the determined location.

In further embodiments, users may participate in groups. To enable these groups, a content service may interface with a social network that includes one or more groups and may associate those groups with user accounts known to the content service. These groups may enable synchronization across multiple user accounts such that activities of one user on one device may affect content displayed to another user on another device. For example, a second electronic device or the content service may receive a first location setting associated with a content item from a first electronic device. In response, the second electronic device or the content service may determine a second location setting associated with the content item for the second electronic device based at least in part on the first location setting.

Example Network and Devices

Figure 1:
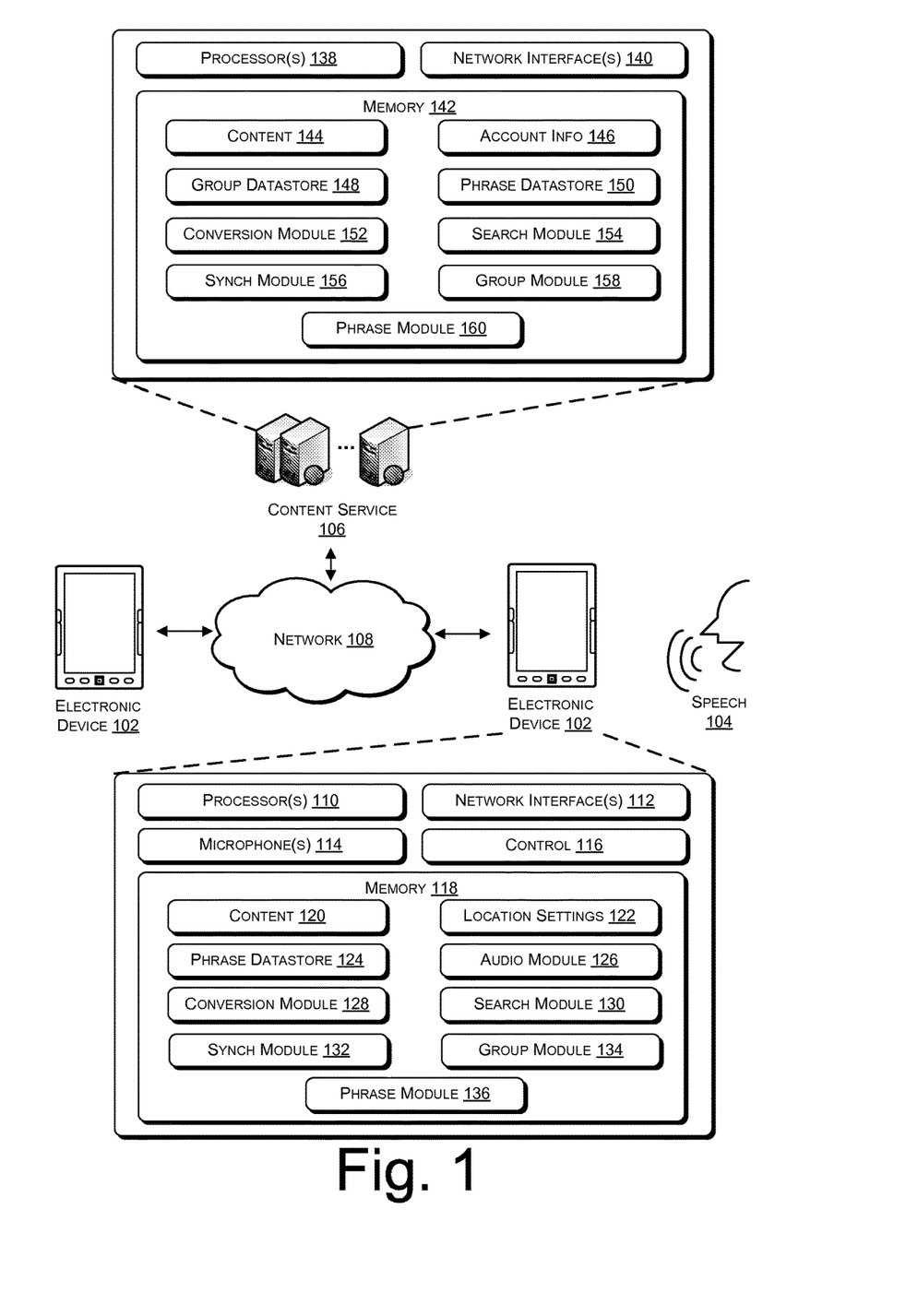
FIG. 1 illustrates electronic devices and an example content service connected by a network, the devices and service configured to synchronize content items based on speech and group activities.

FIG. 1 illustrates electronic devices and an example content service connected by a network, the devices and service configured to synchronize location settings of content items based on speech and group activities. As illustrated in FIG. 1, an electronic device 102 may capture speech 104 in the form of an audio signal. The electronic device 102 may then perform synchronization based on the captured speech 104. In some embodiments, the electronic device 102 communicates with a content service 106 over a network 108 in order to perform the synchronization. In such embodiments, the content service 106 participates in the synchronization. The electronic device 102 may also communicate with another electronic device 102 to synchronize location settings of the electronic devices 102. The two electronic devices 102 may belong to a same group but may also be associated with different user accounts.

As is further shown in FIG. 1, the electronic device 102 may include processor(s) 110, network interface(s) 112, microphone(s) 114, a control 116, and memory 118. The memory 118 may store content items 120, location settings 122 associated with those content items 120, and a phrase datastore 124 that includes groups of phrases respectively associated with the content items 120. Additionally, the memory 118 may store an audio module 126, a conversion module 128, a search module 130, a synchronization module 132, a group module 134, and a phrase module 136.

In various embodiments, the content service 106 may include processor(s) 138, network interface(s) 140, and memory 142. The memory 142 may store content items 144, account information 146, a group datastore 148, and a phrase datastore 150 that includes groups of phrases respectively associated with the content items 144. Additionally, the memory 142 may store a conversion module 152, a search module 154, a synchronization module 156, a group module 158, and a phrase module 160.

In various embodiments, the electronic devices 102 and devices of the content service 106 may each be or include an electronic reading device, a tablet computer, a personal digital assistant (PDA), a cellular phone, a personal computer (PC), a laptop computer, a work station, a media center, a server or server farm, multiple, distributed server farms, a mainframe, or any other sort of device or devices. In one implementation, the computing device(s) of the content service 106 represent a plurality of computing devices working in communication, such as a cloud computing network of nodes. When implemented on multiple computing devices, the content service 106 may distribute the modules and data 144-160 of the content service 106 among the multiple computing devices. In some implementations, one or more of the computing device(s) of the electronic device 102 or the content service 106 represents one or more virtual machines implemented on one or more computing devices.

In various embodiments, the speech 104 may include any speech, song, words, and vocal sounds emitted by a person or device in range of a microphone 114 that is associated with the electronic device 102. For example, a user of the electronic device 102 may attend a book reading, and the speech 104 may include the speech of a person reading a print medium corresponding to a content item. In another example, a user of an electronic device 102 may seek to use speech 104 to browse to a location in a content item. Upon receiving the speech, the electronic device 102 determines whether there are any matching phrases associated with locations in the content item.

In some embodiments, the network 108 may be include any one or more networks, such as wired networks, wireless networks, and combinations of wired and wireless networks. Further, the network 108 may include any one or combination of multiple different types of public or private networks (e.g., cable networks, the Internet, wireless networks, etc.).

In some instances, the electronic devices 102 and the content service 106 communicate over the network using a secure protocol (e.g., https) and/or any other protocol or set of protocols, such as the transmission control protocol/Internet protocol (TCP/IP).

In some embodiments, an electronic device 102 may communicate with another electronic device 102 through the network 108 in a peer-to-peer or client-server manner. When communicating in a client-server manner, communications may first be sent to device(s) of the content service 106 and then on to other electronic device(s) 102. Such communication between electronic devices 102 may occur, for example, when the electronic devices 102 belong to a same group such as a reading group. One member of the group may browse to a different location in a content item, and other members of the group may have their location settings set based on the browsing activity of the member.

As mentioned, an electronic device 102 includes processor(s) 110 and network interface(s) 112. The processor(s) 110 may be or include any sort of processing unit, such as a central processing unit (CPU) or a graphic processing unit (GPU). The network interface(s) 112 allow the electronic device 102 to communicate with one or both of the content service 106 and other electronic devices 102. The network interface(s) 112 may send and receive communications through one or both of the network 108 or other networks. The network interface(s) 112 may also support both wired and wireless connection to various networks. In some embodiments, the microphone(s) 114 may be any one or more microphones that are physically incorporated in the electronic device 102 or separate but communicatively coupled to the electronic device 102.

In various embodiments, the control 116 may be any physical control integrated in a surface of the electronic device 102 or virtual control displayed by a touch-sensitive display of the electronic device 102. The control 116 may be specific to a voice recording function such that, when the control 116 is actuated, recording of speech 104 begins. In one embodiment, an actuation of the control 116 while recording is occurring may result in a halt of the recording.

The memory 118 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, the memory 118 stores content items 120. These content items 120 are local copies of content items that have been obtained by a user of the electronic device 102 from the content service 106. They may include electronic versions of books, magazines, newspapers, and other such print media. Along with the content items 120, the memory 118 may also store location settings 122 and groups of phrases. The location settings 122 include a current reading location for each content item 120. For an unread copy of a content item 120, the location setting 122 may be set to a default location, such as the beginning of the content item. The groups of phrases may be stored in a phrases datastore 124, the phrases datastore 124 including the groups of phrases and associating each group of phrases with a content item 120. Each phrase of the group of phrases includes a sequence of one or more words, sounds, numbers, etc. and an associated location in the content item. The groups of phrases may be distributed by the content service 106 along with their corresponding content items 120. As described further herein, a group of phrases for a content item 120 may be enhanced with additional phrases created by a user of the electronic device 102.

In various embodiments, the audio module 126 receives an audio signal captured by microphone(s) 114 that represents speech 104. The audio module 126 may further cause the capture of the audio signal by requesting a driver or other software interface of the microphone(s) 114 to capture the audio signal. In some embodiments, the audio module 126 makes the request responsive to receiving an indication that the control 116 has been actuated. The audio module 126 may then request that the microphone(s) 114 stop recording after the passage of a predetermined amount of time or responsive to receipt of another indications that the control 116 has been actuated while the microphone(s) 114 are recording. In response to receiving an audio signal, the audio module 126 either invokes the conversion module 128 or sends the audio signal to the content service 106 for conversion by the conversion module 152 of that content service 106.

The conversion module 128 utilizes any of a number of speech-to-text conversion techniques to obtain a textual representation of the speech represented by the audio signal. In one embodiment, the conversion module 128 may communicate with the conversion module 152 of the content service 106, with each of the conversion module 128 and the conversion module 152 performing part of the speech-to-text conversion. In some embodiments, the conversion module 128 maintains a model of the user's speech that is used by the conversion module 128 in obtaining the textual representation. After obtaining the textual representation, the conversion module 128 may invoke any one or more of the search module 130, the phrase module 136, the search module 154 of the content service 106, or the phrase module 160 of the content service 106 for further processing of the textual representation of the speech represented by the audio signal.

In various embodiments, the search module 130 uses the textual representation as a search string to search the content of content items 120 for one or more matches. In other embodiments, the search module 130 may only search an open/active content item 120 for the textual representation. In one embodiment, the search module 130 may communicate with the search module 154 of the content service 106, with each of the search module 130 and the search module 154 performing part of the search.

In response to the search, the search module 130 returns one or more locations in the content items 120 that include content matching the textual representations, as well as samples of that content. When multiple locations are returned, the search module 130 may present a user interface, such as a graphic user interface, showing a user the content samples and associated locations to enable the user to select a single location. In other embodiments, the search module 130 performs the search in a continuous loop. The audio module 126 may continuously capture the audio signal, and the conversion module 128/152 may repeatedly perform speech-to-text conversion of the audio signal, until the increasingly detailed textual representations result in the search module 130 obtaining a single result. At that point, the search module 130 may instruct the audio module 126 to halt capturing of the audio signal. Upon determining a single location or receiving selection of a single location, the search module 130 may invoke the synchronization module 132 or the synchronization module 156 of the content service 106 to utilize the determined/selected location for synchronization.

In further embodiments, the synchronization module 132 receives a location in a content item 120 from a search module 130, group module 134, phrase module 136, search module 154 of the content service 106, group module 158 of the content service 106, or phrase module 160 of the content service 106. Upon receiving the location, the synchronization module 132 determines a current location setting 122 for the content item 120 and updates the location setting 122 based on the received location. In some embodiments, the updating involves automatically setting the location setting 122 to the received location and causing the electronic device 102 to display the content at the updated location setting 122. The synchronization module 132 then communicates the updated location setting 122 to the content service 106 to enable the synchronization module 156 of the content service 106 to update location settings of the content item for other electronic devices associated with a same user account as the electronic device 102.

In various embodiments, the group module 134 provides indicia of activities of the electronic device 102 to other members of a group and receives indicia of activities of electronic devices of the other members of the group. This communication of indicia may occur in a peer-to-peer manner between the electronic devices or in a client-server manner, with the indicia provided through the content service 106. The group module 134, a web browser, or other module may also enable a user of the electronic device 102 to join, create, and/or sign into one or more groups associated with one or more social networks. For example, the group module 134 may provide a user interface that lists existing groups of the social network(s). These existing groups may be received from the content service 106, from the social network(s) or from electronic devices proximate to the electronic device 102. The user interface may also allow the user to specify a group, and information about the group, such as members and associated content items, may be stored locally on the electronic device 102, remotely on the content service 106, remotely on the social network(s), or both locally and remotely. In some embodiments, the group module 134 may also interface with the content service 106 to enable the user to obtain copies of content items for the group.

The group module 134 may have a "group mode" that can be triggered by the electronic device 102, by the content service 106, or by another electronic device in a group. In some embodiments, the user may be asked to consent to the group mode before entering it, and/or may enter the group mode by signing into a social network. In group mode, the group module 134 tracks content consumption activities of the user of the electronic device 102 with respect to content items 102 that are associated with a group. In response to determining that the user's activities have resulted in an updated location setting 122, the group module 134 notifies the content service 106 or other electronic devices in the group of the updated location setting 122. Also, as mentioned above, the group module 134 receives notifications of updated location settings from the content service 106 or other electronic devices in the group. In response to receiving such updated location settings, the group module 134 invokes the synchronization module 132 to update the location setting 122 based on the received updated location setting.

In various embodiments the phrase module 136 receives a textual representation from the conversion module 128 and determines whether any phrases in the phrases datastore 124 match the textual representation. If the phrase module 136 determines that there is a match, the phrase module 136 retrieves the location associated with the matching phrase and invokes the synchronization module 132 to update a location setting 122 based on the retrieved location. If the phrase module 136 determines that there is no match, the phrase module 136 may provide an option to create a phrase associated with the speech 104 represented by the textual representation. For example, the phrase module 136 may provide a browsing user interface or search user interface to enable a user of the electronic device 102 to locate content in a copy of a content item 120 to associate with the speech 104. In response to selection of such content, the content and its location may be associated with the vocal expression 104 and stored as a phrase in the phrases datastore 124. The phrase module 136 may also provide the created phrase to the phrase module 160 of the content service 106 for sharing with other electronic devices. In some embodiments, the phrase module 136 may further provide a feedback mechanism to enable a user to downvote or eliminate phrases created by users from the group of phrases.

As mentioned, device(s) of the content service 106 include processor(s) 138 and network interface(s) 140. The processor(s) 138 may be or include any sort of processing unit, such as a central processing unit (CPU) or a graphic processing unit (GPU). The network interface(s) 140 allow the device(s) of the content service 106 to communicate with electronic devices 102. The network interface(s) 140 may send and receive communications through one or both of the network 106 or other networks. The network interface(s) 140 may also support both wired and wireless connection to various networks.

The memory 142 may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, the memory 142 includes a collection of content items 144. As mentioned, the content items may include electronic versions of books, magazines, newspapers, and other such print media. The collection of content items 144 may be made available to users through an ecommerce website or some other sort of user interface mechanism, and upon purchase or other sort of acquisition, the content service 106 may associate an content item in the collection 144 with a user account (represented by the account information 146) and may provide a copy of the content item from the collection 144 to electronic device(s) 102 associated with the user account. In some embodiments, a content item may be obtained on behalf of a group and may be provided to electronic devices 102 of the group from the collection 144.

The account information 146 stored in the memory 142 may include information identifying a user account and electronic device(s) 102 associated with that user account, a list of content items associated with the user account, location settings for the content items, and a list of groups that the user account is associated with.

In some embodiments, the groups datastore 148 stored in the memory 142 may include information identifying groups, user accounts associated with each group, lists of content items associated with each group, and location settings associated with the content items. In some embodiments, the information stored in the groups datastore 148 may be obtained at least partly from one or more social networks.

The phrases datastore 150 includes groups of phrases and associates each group of phrases with a content item in the collection 144. Each phrase in a group of phrases includes a sequence of one or more words, sounds, numbers, etc. and an associated location in the content item. The groups of phrases may be distributed by the content service 106 along with copies of their corresponding content items. As described further herein, a group of phrases for a content item may be enhanced with additional phrases created by a user of the electronic device 102, those phrases being received by the content service 106 from the electronic devices 102 and stored in the phrases datastore 150. The groups of phrases may also include phrases created using mechanical turk processing.

In various embodiments, the conversion module 152 utilizes any of a number of speech-to-text conversion techniques to obtain a textual representation using an audio signal. The conversion module 152 may receive the audio signal from an audio module 126 or conversion module 128 of an electronic device 102. In one embodiment, the conversion module 152 may communicate with the conversion module 128 of the electronic device 102, with each of the conversion module 128 and the conversion module 152 performing part of the speech-to-text conversion. In some embodiments, the conversion module 152 maintains a model of the speech of the user of the electronic device 102 that is used by the conversion module 152 in obtaining the textual representation. After obtaining the textual representation, the conversion module 152 may invoke any one or more of the search module 130 of the electronic device 102, the phrase module 136 of the electronic device 102, the search module 154, or the phrase module 160 for further processing of the textual representation of the speech represented by the audio signal.

In various embodiments, the search module 154 uses the textual representation as a search string to search the content of content items for one or more matches. In other embodiments, the search module 154 may only search a copy of a content item that is open/active on the electronic device 102 for the textual representation. In one embodiment, the search module 130 of the electronic device 102 may communicate with the search module 154, with each of the search module 130 and the search module 154 performing part of the search.

In response to the search, the search module 154 returns one or more locations in the content items that include content matching the textual representations, as well as samples of that content. When multiple locations are returned, the search module 154 may present a user interface, such as a graphic user interface, on the electronic device 102 showing a user the content samples and associated locations to enable the user to select a single location. In other embodiments, the search module 154 performs the search in a continuous loop. The audio module 126 may continuously capture the audio signal, and the conversion module 128/152 may repeatedly perform speech-to-text conversion of the audio signal, until the increasingly detailed textual representations result in the search module 154 obtaining a single result. At that point, the search module 154 may instruct the audio module 126 to halt capturing of the audio signal. Upon determining a single location or receiving selection of a single location, the search module 154 may invoke the synchronization module 132 of the electronic device 102 or the synchronization module 156 to utilize the determined/selected location for synchronization.

In further embodiments, the synchronization module 156 receives a location in an content item from a search module 130 of an electronic device 102, a group module 134 of an electronic device 102, a phrase module 136 of an electronic device 102, search module 154, group module 158, or phrase module 160. Upon receiving the location, the synchronization module 156 determines a current location setting 122 for the content item 120 for an electronic device 102 and updates the location setting 122 based on the received location. This updating may involve one or both of updating a location setting stored in the account information 146 or updating the location setting 122 on the electronic device 102. In some embodiments, the updating involves automatically setting the location setting 122 to the received location and causing the electronic device 102 to display the content at the updated location setting 122. The synchronization module 156 then communicates the updated location setting 122 to other electronic devices associated with a same user account as the electronic device 102.

In various embodiments, the group module 158 receives indicia of activities of one electronic device 102 in a group and provides the indicia to other members of that group. The identities of the other members of the group are obtained from the group datastore 148. In some embodiments, the group module 158 may also enable a user to obtain copies of content items in the collection 144 for the group.

In some embodiments, while an electronic device 102 is in a "group mode," the group module 158 tracks content consumption activities of a user of the electronic device 102 with respect to content items 120 that are associated with a group. In response to determining that the user's activities have resulted in an updated location setting 122, the group module 158 notifies the other electronic devices in the group that are also in the "group mode" of the updated location setting 122. The group module 158 may also or instead invoke the synchronization module 156 to update the location settings of group members for the content item based on the received updated location setting 122.

In various embodiments, the phrase module 160 receives a textual representation from the conversion module 128 of the electronic device 102 or from the conversion module 152 and determines whether any phrases in the phrases datastore 150 match the textual representation. If the phrase module 160 determines that there is a match, the phrase module 160 retrieves the location associated with the matching phrase and invokes the synchronization module 132 of the electronic device 102 or the synchronization module 156 to update a location setting based on the retrieved location. If the phrase module 160 determines that there is no match, the phrase module 160 may provide an option to create a phrase associated with the speech 104 represented by the textual representation. For example, the phrase module 160 may provide a browsing user interface or search user interface to enable a user of the electronic device 102 to locate content in a content item to associate with the speech 104. In response to selection of such content, the content and its location may be associated with the speech 104 and stored as a phrase in the phrases datastore 150. The phrase module 160 may also provide the created phrase to the phrase modules 136 of the electronic devices 102 to update the phrase datastores 124 of those electronic devices 102. Further, the phrase module 160 may receive phrases created by users of the electronic devices 102 and may add those phrases to the phrase datastore 150 and disseminate those phrases to other electronic devices.

In some instances, the electronic device 102 and/or the content service 106 may have features or functionality in addition to those that FIG. 1 illustrates. For example, the electronic device 102 and/or content service 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the electronic device 102 and/or content service 106 may reside remotely in some implementations. In these implementations, the electronic device 102 may utilize the network interface(s) 112 to communicate with and utilize this functionality, and the content service 106 may utilize the network interface(s) 140 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 2:
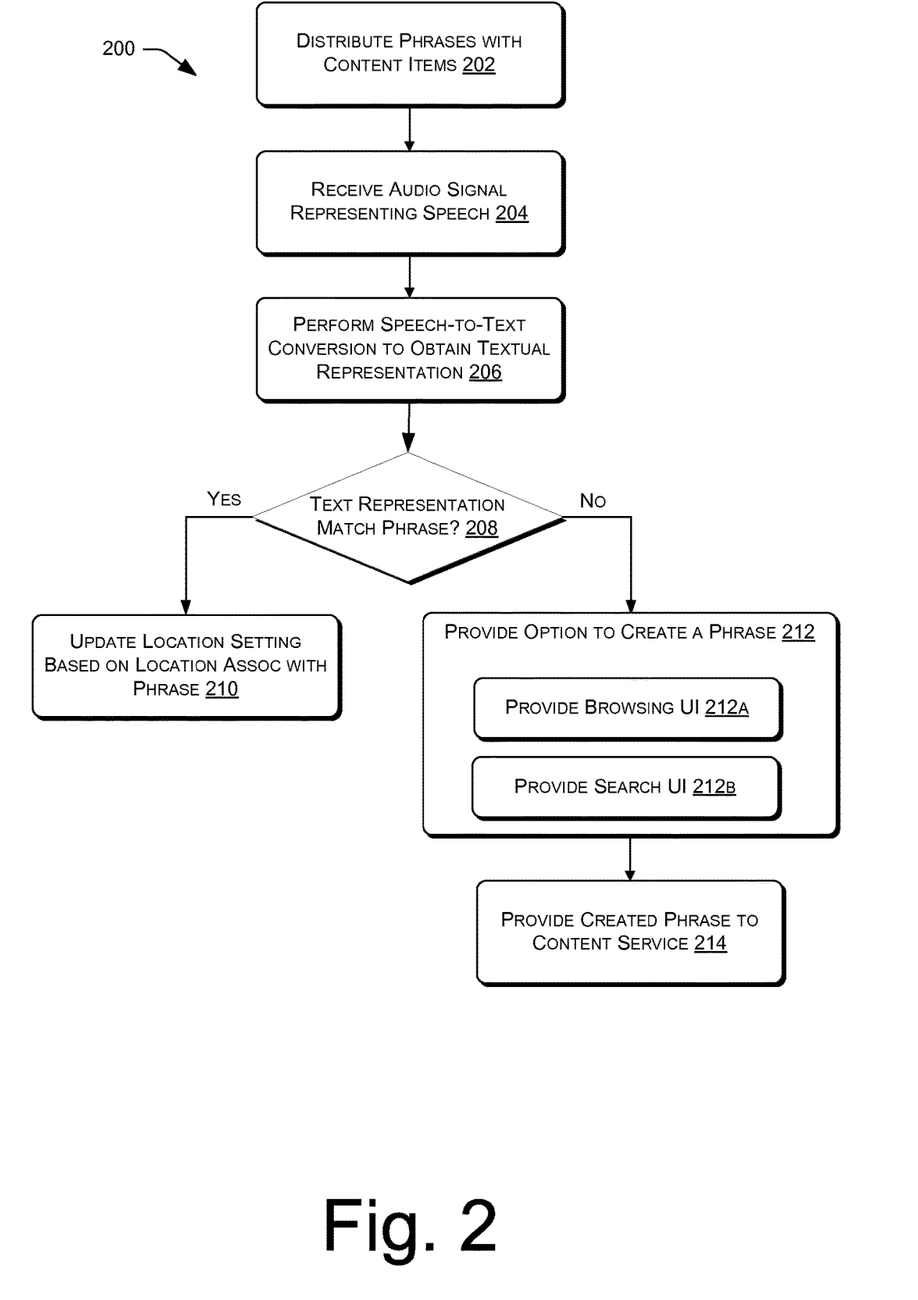
FIG. 2 illustrates an example process for receiving an audio signal that represents speech, determining whether the speech includes one of a plurality of phrases, and, in response to the determining, either providing an option to create a phrase corresponding to the speech or updating a location setting based on the phrase corresponding to the speech.

FIG. 2 illustrates an example process for receiving an audio signal that represents speech, determining whether the speech includes one of a plurality of phrases, and, in response to the determining, either providing an option to create a phrase corresponding to the speech or updating a location setting based on the phrase corresponding to the speech. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 200 includes, at 202, an electronic device receiving phrases and content items distributed from a content service. The phrases may be groups of phrases, each group of phrases associated with one of the content items. In some embodiments, a group of phrases may include phrases created by users of electronic devices, such as by a user of the electronic device or by another user of another electronic device.

At 204, the electronic device receives an audio signal that represents speech. At 206, upon receiving the audio signal, the electronic device performs speech-to-text conversion using the audio signal to obtain a textual representation of the speech represented by the audio signal. At 208, the electronic device then compares the textual representation to the phrases of the groups of phrases to determine whether the textual representation matches any of the phrases.

At 210, in response to determining that the textual representation matches a phrase, the electronic device determines a location in a content item associated with the phrase and updates a location setting for that content item based on the location.

At 212, in response to determining that the textual representation does not match a phrase, the electronic device provides an option to create a phrase for the speech. At 212a, providing the option includes providing a browsing user interface to enable a user to browse to content of a content item and to associate the content and a location of the content with the speech. At 212b, providing the option includes providing a search user interface to enable search of a content item for content associated with a search query and to associate the content and a location of the content with the speech. At 214, the electronic device may provide the created phrase to the content service.

Figure 3:
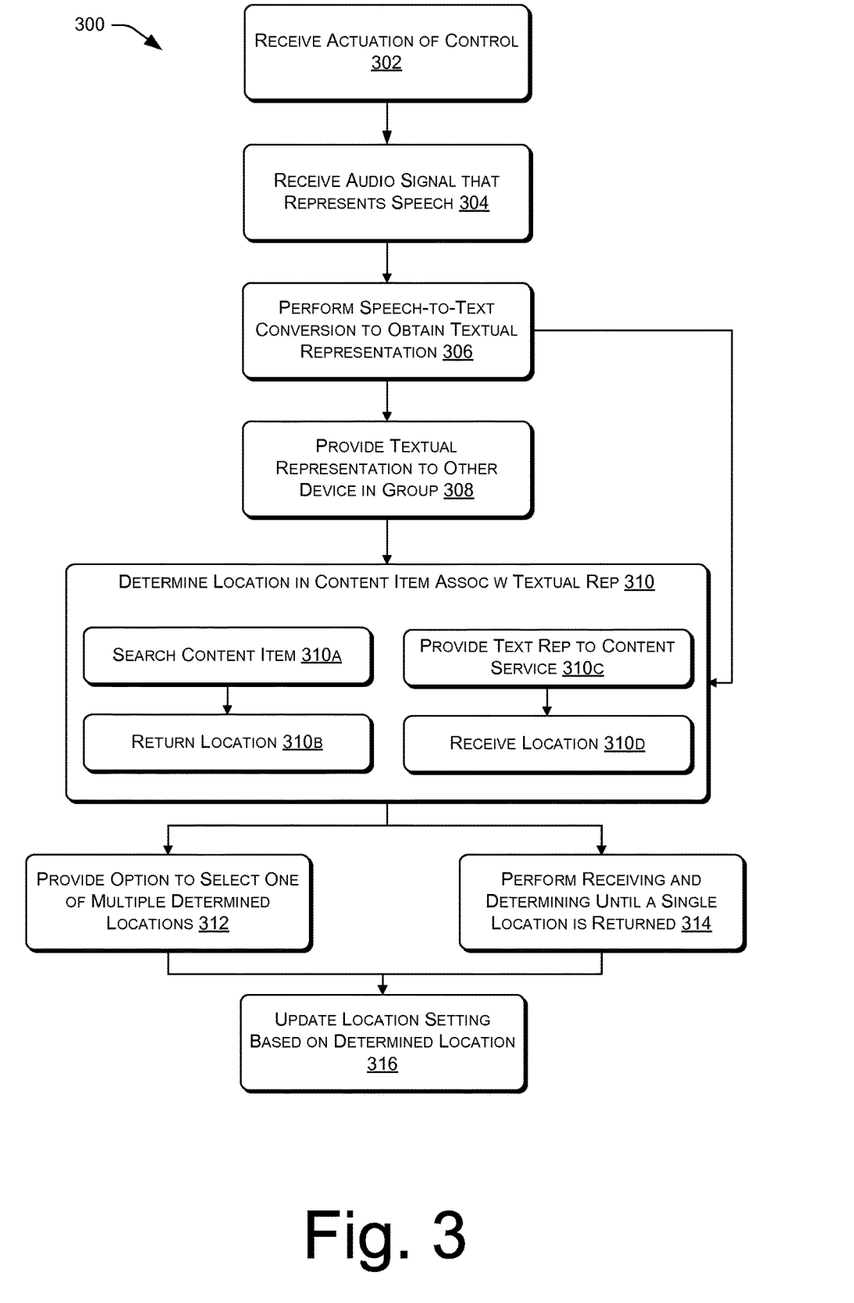
FIG. 3 illustrates an example process for receiving an audio signal that represents speech, determining a location in an content item that is associated with the audio signal, and updating a location setting associated with the content item based on the determined location.

FIG. 3 illustrates an example process for receiving an audio signal that corresponds to speech, determining a location in a content item that is associated with the audio signal, and updating a location setting of the content item based on the determined location. The process 300 includes, at 302, receiving an actuation of a control of the electronic device. At 304, responsive to the actuation, the electronic device may receive an audio signal that represents speech, the audio signal captured by microphone(s) associated with the electronic device.

At 306, the electronic device performs speech-to-text conversion using the audio signal to obtain a textual representation of the speech represented by the audio signal. In some embodiments, at 308, the electronic device then provides the textual representation to another electronic device, such as another electronic device in a same group as the electronic device, to enable the other electronic device to perform the operations at 310-316 using the textual representation.

At 310, the electronic device then determines a location in a content item that is associated with the textual representation. At 310a, the electronic device searches a copy of the content item using the textual representation as a search string. Upon finding one or more locations that include content matching the textual representation, the electronic device, at 310b, returns the one or more locations. At 310c, the electronic device alternatively or additionally provides the textual representation to a content service and receives in return, at 310d, one or more locations in a content item.

At 312, when multiple locations are returned, the electronic device may provide an option for a user to select one of the locations as the location corresponding to the speech. Alternatively, at 314, the electronic device may continue to perform the operations shown at 302-310 until a single location is returned.

At 316, the electronic device then updates a location setting for the content item based at least in part on the determined location.

Figure 4:
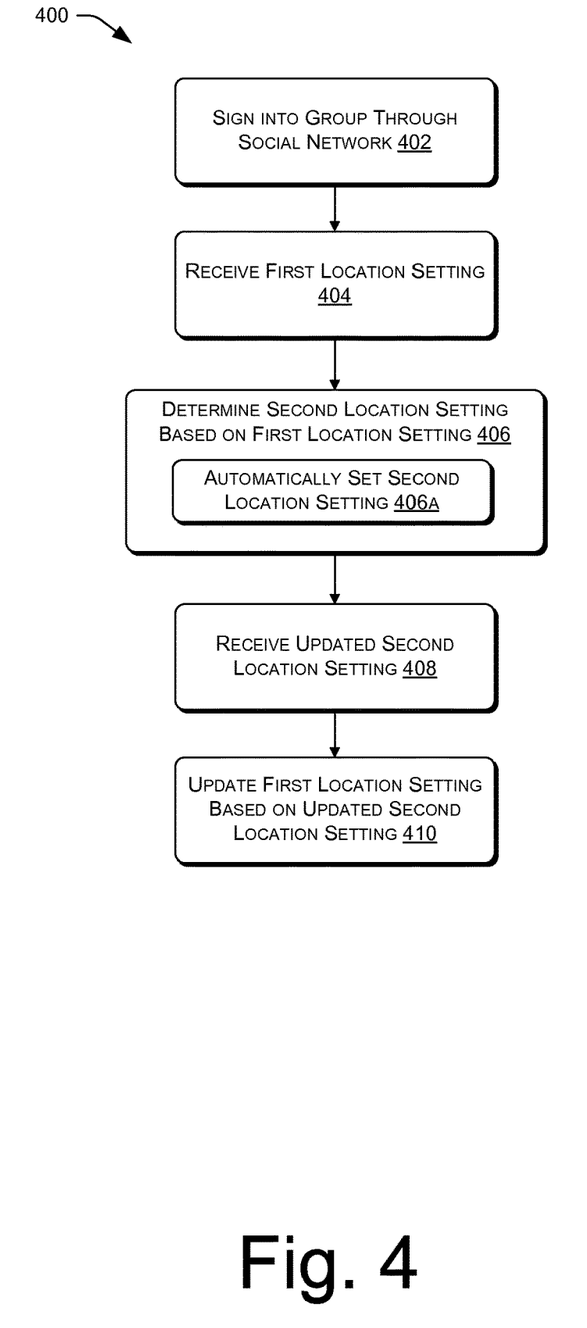
FIG. 4 illustrates an example process for receiving a first location setting associated with a content item from a first device and determining a second location setting of the content item for a second device based on the first location setting, the first and second devices belonging to a group.

FIG. 4 illustrates an example process for receiving a first location setting associated with a content item from a first device and determining a second location setting for the content item for a second device based on the first location setting, the first and second devices belonging to a group. The process 400 includes, at 402, an content service enabling a user to sign into a group through a social network.

At 404, either a second electronic device or a content service receives a first location setting for a content item from a first electronic device. In some embodiments, the first location setting may have been updated based at least in part on an audio signal that represents speech.

At 406, the second electronic device or the content service determines a second location setting for the content item for the second electronic device. Both the first electronic device and the second electronic device may be members of a same group. At 406a, the second electronic device or the content service then automatically sets the second location setting to the first location setting. In some embodiments, automatically setting the second location setting causes the second electronic device to display content of the content item associated with the first location setting in place of previously displayed content associated with the second location setting.

At 408, the first electronic device or the content service receives a second location setting from the second electronic device, the second location setting having been updated based on interaction with the content item. At 410, the first electronic device or the content service updates the first location setting based at least in part on the updated second location setting.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
at least one database storing a first phrase associated with a content item;
one or more processors; and
instructions that, when executed by the one or more processors, cause the one or more processors to perform operations comprising:
receiving, via a network, an audio signal representing speech continuously captured by an electronic device, the speech representing one or more words of content to be searched in the content item;
obtaining a textual representation of the speech, the textual representation including the one or more words of the content;
using the textual representation to find a location of the one or more words of the content in the content item;

instructing an audio module to halt continuously capturing the audio signal upon finding the location of the one or more words of the content;

associating the location and the one or more words of the content with the textual representation;

generating a second phrase associated with the content item, the second phrase including the textual representation;

storing the second phrase in the at least one database;

determining a location setting associated with the content item based at least in part on the location of the one or more words of the content; and sending the location setting to the electronic device.

2. The system of claim 1, the operations further comprising:

obtaining an additional textual representation of additional speech represented by an additional audio signal, and determining that the additional textual representation corresponds to the first phrase.

3. The system of claim 1, the operations further comprising providing a user interface that enables a user to browse to the location of the content in the content item and to associate the content with the textual representation.

4. The system of claim 1, the operations further comprising:

locating the content at the location.

5. The system of claim 1, the operations further comprising providing the second phrase associated with the content item to an additional electronic device.

6. The system of claim 1, wherein the sending the location setting to the electronic device causes the electronic device to provide the content associated with the textual representation.

7. A computer-implemented method comprising:

storing, by one or more computing devices, a content item;

receiving, by the one or more computing devices, and from a first electronic device via a network, an audio signal representing speech continuously captured from the first electronic device via the network, the speech comprising a request to find a location of content in the content item;

performing, by the one or more computing devices, speech-to-text conversion using the audio signal to obtain a textual representation of the speech to associate the speech with the content;

determining, by the one or more computing devices, and based at least in part on the textual representation, the location in the content item that includes the content associated with the audio signal;

instructing the electronic device to halt continuously capturing the audio signal upon determining the location of the content item;

determining, by the one or more computing devices, a location setting associated with the content item based at least in part on the location; and sending, by the one or more computing devices, and to a second electronic device via the network, the location setting, the sending causing the second electronic device to provide the content.

8. The method of claim 7, further comprising sending, to the first electronic device, the location setting, the first electronic device and the second electronic device both belonging to a same group.

9. The method of claim 7, further comprising:

receiving an indication of an actuation of a control of the first electronic device, and wherein the receiving of the audio signal is based at least in part on the receiving of the indication.

10. The method of claim 7, wherein the determining the location in the content item comprises:

searching the content item to locate the textual representation within the content item; and returning the location based at least in part on the searching.

11. The method of claim 7, wherein the determining the location in the content item comprises searching the content item to locate the textual representation.

12. The method of claim 7, further comprising:

determining, based at least in part on the textual representation, an additional location in the content item;

providing data indicating the location and the additional location; and receiving an indication of a selection associated with the location, and wherein the determining the location setting associated with content item is further based at least in part on the selection.

13. The method of claim 7, further comprising repeatedly performing the receiving and the determining the location in the content item until the determining the location returns a single location associated with the audio signal.

14. The method of claim 7, further comprising:

receiving, from the second electronic device via the network, an additional audio signal that represents additional speech;

performing speech-to-text conversion using the additional audio signal to obtain an additional textual representation of the additional speech;

determining, based at least in part on the additional textual representation, an additional location in the content item that includes content associated with the additional audio signal;

determining an additional location setting associated with the content item based at least in part on the additional location; and sending, to the first electronic device via the network, the additional location setting, the sending of the additional location setting causing the first electronic device to provide the content associated with the additional audio signal.

15. A system comprising:

one or more processors; and one or more computer-readable media storing instructions that, when executed by the one or more processors, cause the one or more processors to perform operations comprising:

storing a content item;

receiving, from a first electronic device via a network, an audio signal representing speech continuously captured from the electronic device via the network, the speech representing one or more words of content in the content item;

performing speech-to-text conversion using the audio signal to obtain a textual representation of the speech to associate the speech with the content;

determining, based at least in part on the textual representation of the speech, the location in the content item that includes the content associated with the audio signal;

instructing the first electronic device to halt continuously capturing the audio signal upon determining the location;

determining a first location setting associated with the content item for a second electronic device;

determining, based at least in part on the location, a second location setting associated with the content item for the second electronic device; and sending, to the second electronic device via the network, the second location setting.

16. The system of claim 15, the operations further comprising providing, to the first electronic device, a user interface for signing into a social network associated with a group of electronic devices, wherein the group of electronic devices includes the first electronic device and the second electronic device.

17. The system of claim 15, wherein the determining the second location setting comprises automatically updating the first location setting to the location in the content item.

18. The system of claim 15, wherein the sending the second location setting to the second electronic device causes the second electronic device to display the content associated with the audio signal in place of previously displayed content of the content item associated with the first location setting.

19. The system of claim 15, the operations further comprising:
  determining a third location setting associated with the content item for the first electronic device;
  determining, based at least in part on an additional audio signal that corresponds to speech, a fourth location setting associated with the content item for the first electronic device; and
  determining, based at least in part on the fourth location setting, a fifth location setting associated with the content item for the second electronic device.

20. The system of claim 15, the operations further comprising:
  receiving, from the second electronic device, a third location setting associated with the content item, wherein the third location setting is based at least in part on inputs received by the second electronic device; and
  determining a fourth location setting associated with the content item for the first electronic device based at least in part on the third location setting.

21. The system of claim 15, the operations further comprising:
  determining, based at least in part on the audio signal, a third location setting associated with the content item for the first electronic device; and
  exchanging the third location setting or the second location setting between the first electronic device and the second electronic device in a peer-to-peer or client-server manner.

22. The system of claim 15, the operations further comprising:
  receiving, from the second electronic device via the network, an additional audio signal that represents additional speech;
  determining, based at least in part on the additional audio signal, an additional location in the content item that includes content associated with the additional audio signal;
  determining, based at least in part on the additional location, a third location setting associated with the content item for the second electronic device;
  determining, based at least in part on the additional location, a fourth location setting associated with the content item for the first electronic device;
  sending, to the second electronic device via the network, the third location setting; and
  sending, to the first electronic device via the network, the fourth location setting.

* * * * *